US007686561B2

(12) United States Patent
Smith et al.

(10) Patent No.: US 7,686,561 B2
(45) Date of Patent: Mar. 30, 2010

(54) REMOTELY OPERATED SELF-LOADING/UNLOADING RAILROAD GONDOLA CAR-TOP MATERIAL HANDLER

(75) Inventors: Marvin D. Smith, Stillwater, OK (US); Fred Schroeder, Stillwater, OK (US); Randy Perry, Cleveland, OK (US); Bill Klutts, Muskogee, OK (US)

(73) Assignee: The Board of Regents for Oklahoma State University, Stillwater, OK (US)

( * ) Notice: Subject to any disclaimer, the term of this patent is extended or adjusted under 35 U.S.C. 154(b) by 110 days.

(21) Appl. No.: 10/836,637

(22) Filed: Apr. 30, 2004

(65) Prior Publication Data

US 2005/0244255 A1 Nov. 3, 2005

(51) Int. Cl.
*B65G 67/00* (2006.01)

(52) U.S. Cl. ........................ 414/339; 414/333; 414/809; 212/301; 212/302

(58) Field of Classification Search ................. 414/333, 414/809, 339; 212/301, 302
See application file for complete search history.

(56) References Cited

U.S. PATENT DOCUMENTS

| | | | | | |
|---|---|---|---|---|---|
| 3,630,544 | A | * | 12/1971 | Grisham et al. | 280/764.1 |
| 4,096,954 | A | * | 6/1978 | Buckner | 414/339 |
| 4,099,635 | A | * | 7/1978 | Leonard et al. | 414/800 |
| 4,128,180 | A | * | 12/1978 | Mellious | 414/339 |
| 4,175,902 | A | * | 11/1979 | Herzog et al. | 414/339 |
| 4,190,394 | A | * | 2/1980 | Herzog et al. | 414/809 |
| 4,241,811 | A | | 12/1980 | Buckner | 188/43 |
| 4,479,750 | A | * | 10/1984 | Johnson, Jr. | 414/392 |
| 4,613,272 | A | * | 9/1986 | vom Braucke et al. | 414/347 |
| 4,723,886 | A | * | 2/1988 | Frederking | 414/339 |
| 4,830,562 | A | | 5/1989 | Frederking | 414/339 |
| 5,037,264 | A | * | 8/1991 | Lloyd | 414/339 |
| 5,066,188 | A | * | 11/1991 | Bush | 414/339 |
| 5,401,055 | A | * | 3/1995 | Pham | 280/755 |
| 6,190,106 | B1 | * | 2/2001 | Richardson et al. | 414/339 |
| 6,364,594 | B1 | * | 4/2002 | Kagan et al. | 414/399 |
| 6,561,742 | B1 | * | 5/2003 | Crawford et al. | 414/339 |
| 2004/0037681 | A1 | * | 2/2004 | Marcotte | 414/339 |

FOREIGN PATENT DOCUMENTS

CA 2148668 11/1996

OTHER PUBLICATIONS

Definition of clamp from http://www.thefreedictionary.com/clamped.*

* cited by examiner

*Primary Examiner*—Michael S Lowe
(74) *Attorney, Agent, or Firm*—Fellers, Snider, Blankenship, Bailey and Tippens

(57) ABSTRACT

A material-handler adapted for locating on top of an open topped railroad car includes a chassis mounted on tracks, and a first and second pair of outriggers extending from the chassis. Wheels and clamps are located at the distal ends of the outriggers to stabilize the material handler on the top of the railroad car. A knuckle boom is rotatably mounted on the chassis for manipulating cargo materials. The material handler of the invention also utilizes the clamps and wheels on the outriggers in conjunction with the boom to self-load and self-unload the material handler to and from the top of a railroad car, and to and from one care to another with possible different height and width. Operator safety is enhanced by allowing the operator to control the self-loading and unloading via remote control.

20 Claims, 9 Drawing Sheets

REMOTELY OPERATED SELF-LOADING/UNLOADING RAILROAD GONDOLA CAR-TOP MATERIAL HANDLER

BACKGROUND OF THE INVENTION

1. Field of the Invention

This invention relates generally to a material handler for loading and unloading open-topped railroad cars. In particular, the material handler of the invention is a self-propelled crane capable of self-loading and self-unloading to and from the top of a railroad car via remote control and is also capable of moving from the top of one railroad car to the top of another railroad car.

2. Background

Railroad cars having an open top are used extensively to transport cargo of various types. Cost effective loading and unloading of open topped railroad cars is problematic. Consequently, various methods and devices have been proposed for efficient loading and unloading operations. For example, U.S. Pat. Nos. 4,723,886 and 4,830,562 to Frederking for "Method and Apparatus for Loading and Unloading Railroad Gondola Cars" teaches a hydraulic excavator having a boom structure and material-handling device mounted on two tracks. The two tracks are movable inwardly or outwardly to fit inside a gondola or on the top edges of the sides of the gondola cars. A ramp is required to allow access into the gondola.

U.S. Pat. No. 6,190,106 to Richardson for "Apparatus for Unloading Open-Top Railroad Cars" teaches a frame for locating on a top of railroad cars onto which an excavator may be set. The frame accommodates an excavator having either wheels or tracked treads and allows an excavator to on load or offload material from atop railroad cars. The frame has arms with attachments provided to slide along the sidewall tops of railroad cars. The boom of the excavator is used to slide the frame along. The patent also teaches a special trailer design that doubles as a ramp for use during loading and unloading.

For safety reasons, it is desirable to distance an operator from heavy equipment during loading and unloading of the equipment onto and off of the tops of railroad cars. Additionally, it is desirable to minimize the weight of such equipment, but still provide a means to anchor the equipment so that it does not topple from the railroad car when the boom is extended and loaded. Further, it is desirable to provide equipment that is capable of self-loading and unloading onto a railroad car without having to provide additional equipment, such as a second crane, ramps, and the like to facilitate loading. It is also desirable to have the capacity of transferring loading and unloading equipment from the top of a first railroad car to the top of a second railroad car of a different size without requiring use of additional equipment.

SUMMARY OF THE INVENTION

According to the present invention there is provided an improvement in a material handler for loading and unloading railroad cars. The material handler of the invention provides a self-loading and unloading crane that may be operated from the top of railroad gondola cars. The material handler may be remotely operated, which allows for safety to be enhanced by stationing the operator a safe distance from the material handler while the material handler self-loads and unloads from the top of the gondola cars. The material handler is self-propelled by a track system that provides propulsion on the ground or on top of gondola cars. The width of the handler track system may be adjusted to operate on gondola cars having various heights and widths. The tracks operate in conjunction with adjustable structural members that assist in providing a safe method of crossing from one gondola car to an adjacent car which may be of the same or different height and width.

The material handler of the invention is stabilized on top of a railroad car by outriggers that may be hydraulically affixed to the top of the sides of the gondola car. A preferred material handler has a boom rotation of 410 degrees and is capable of unloading an entire railroad car from a location atop the railroad car. Nominal training and coordination is required to operate the system. Use of the material handler of the invention eliminates one load and one unload operation of material as compared to typical truck system operations. The material handler is capable of utilizing various attachments for loading and unloading materials. Typical materials include bundles of ties, individual ties, tie plates, spikes, and aggregate that is typically used in "maintenance way" projects.

The primary components of the material handler include a chassis, stabilizers such as two pairs of outriggers, a propulsion device such as tracks, knuckle boom with attached grapple, engine, hydraulic pump and tank, operator's station and remote control system. Preferably, all of the primary components attach to the chassis of the material handler. The chassis has sufficient structural integrity to transfer loads from the knuckle boom to the outriggers and onto the gondola car sides. The material handler of the invention is an improvement over known gondola car-top systems, which use the weight of the unit to balance loads due to the boom during material loading and unloading.

A better understanding of the present invention, its several aspects, and its advantages will become apparent to those skilled in the art from the following detailed description, taken in conjunction with the attached drawings, wherein there is shown and described the preferred embodiment of the invention, simply by way of illustration of the best mode contemplated for carrying out the invention.

DETAILED DESCRIPTION OF THE PREFERRED EMBODIMENT

Figure 1:
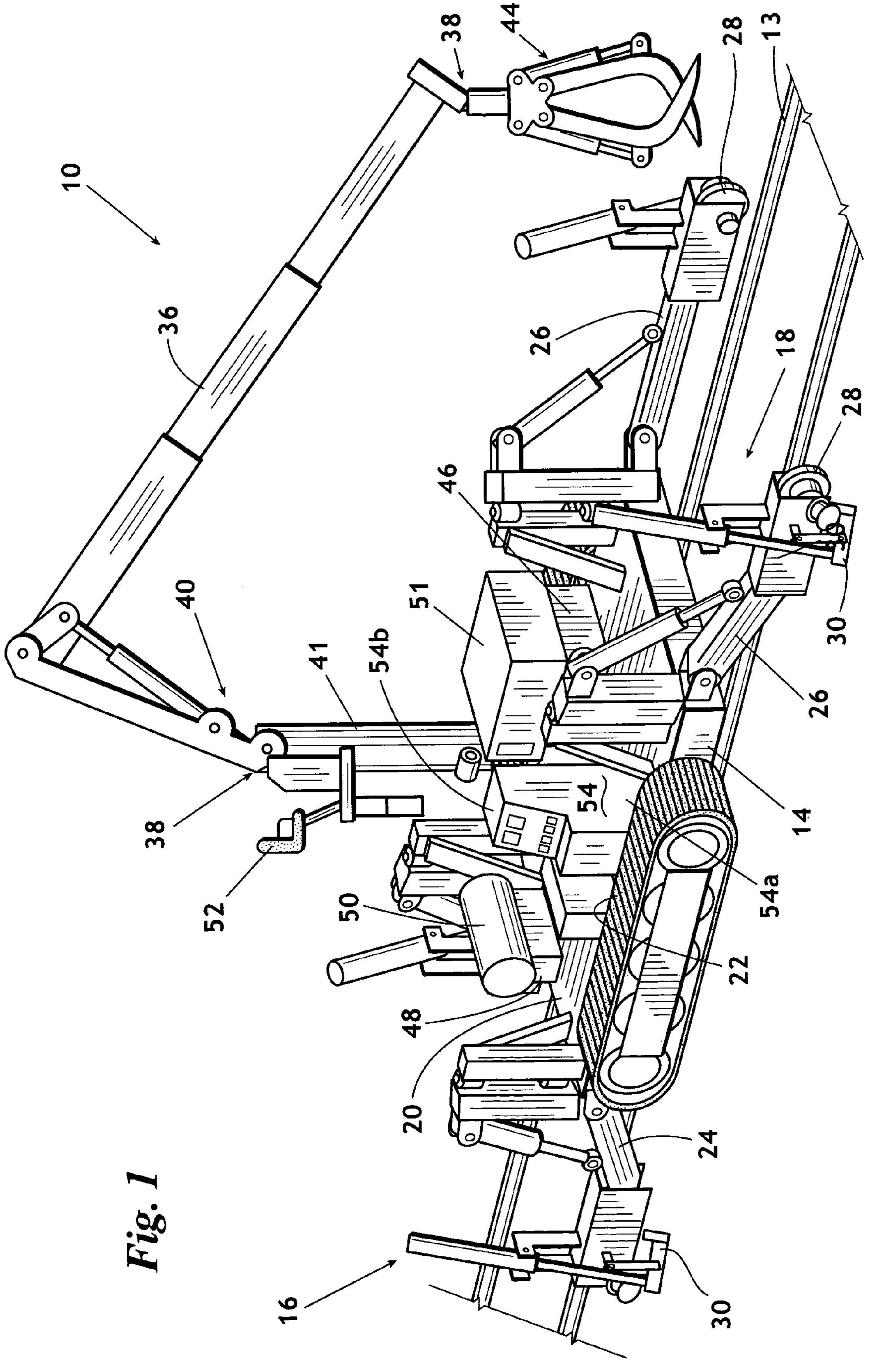
FIG. 1 is a perspective view of the material handler of the invention.
Figure 2:
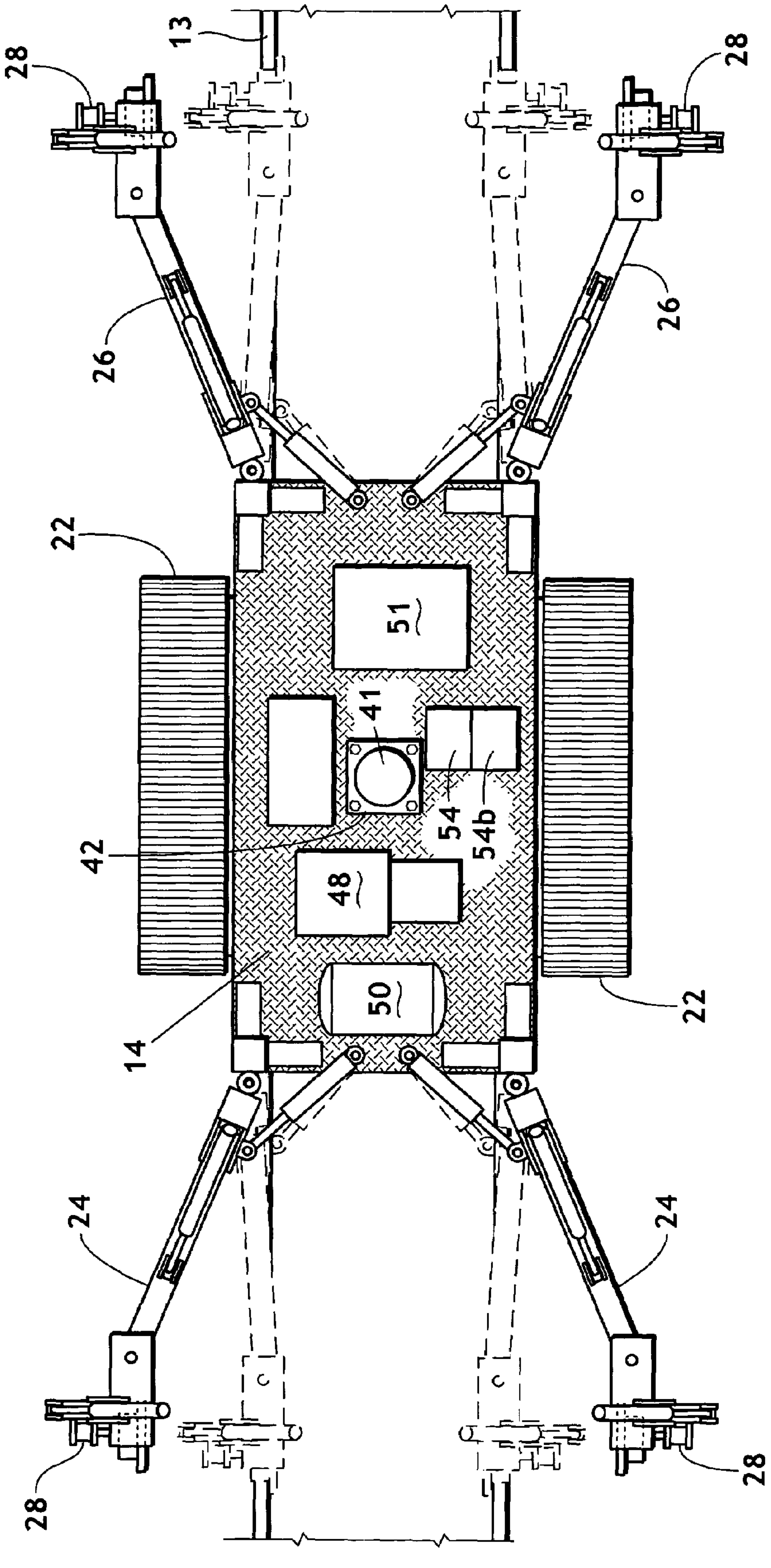
FIG. 2 is a plan view of the material handler of FIG. 1.
Figure 3:
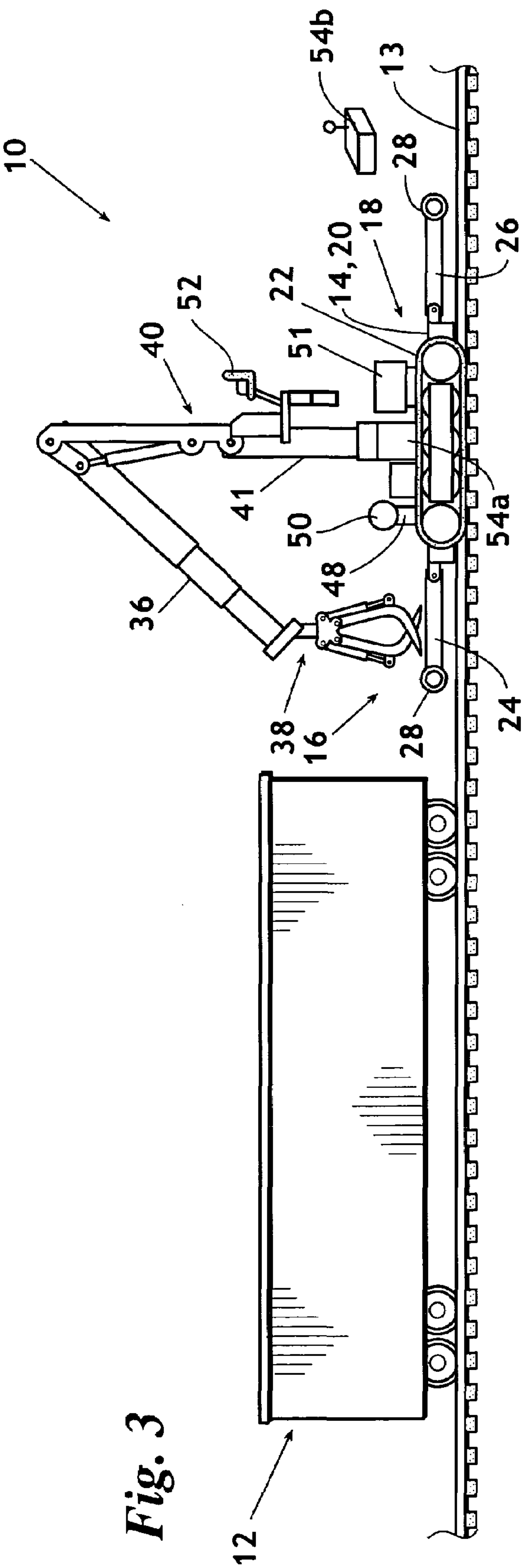
FIG. 3 is a schematic view of the material handler of FIG. 1 shown positioned at the end of a gondola car.
Figure 4:
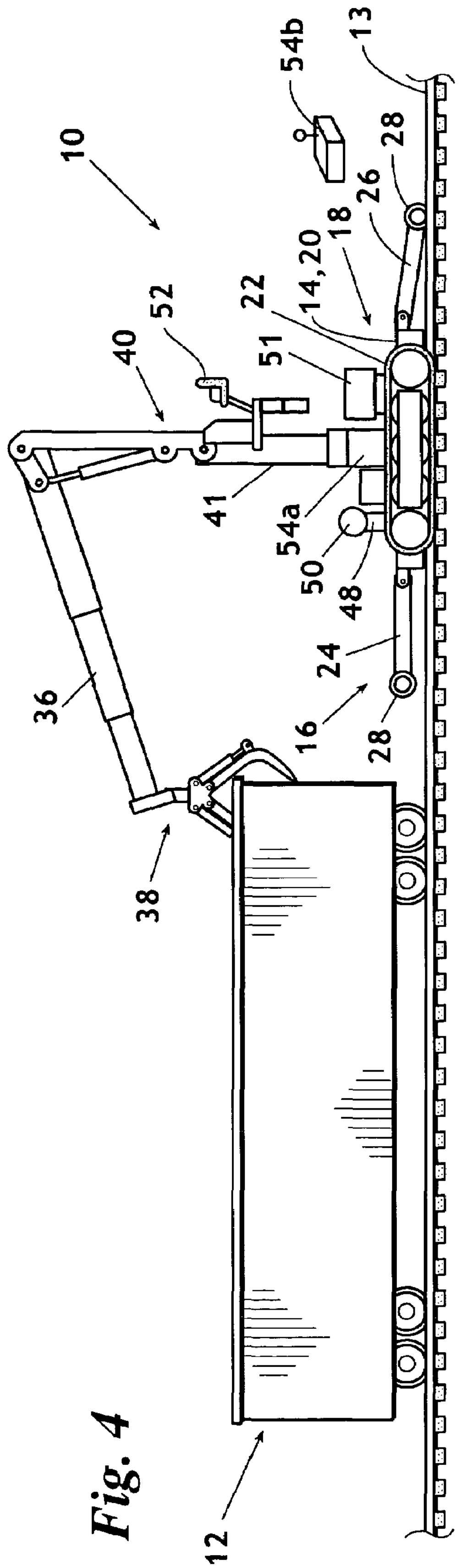
FIG. 4 is a schematic view of the material handler of FIG. 1 shown grasping an end of a gondola car with a grapple suspended on a boom.
Figure 5:
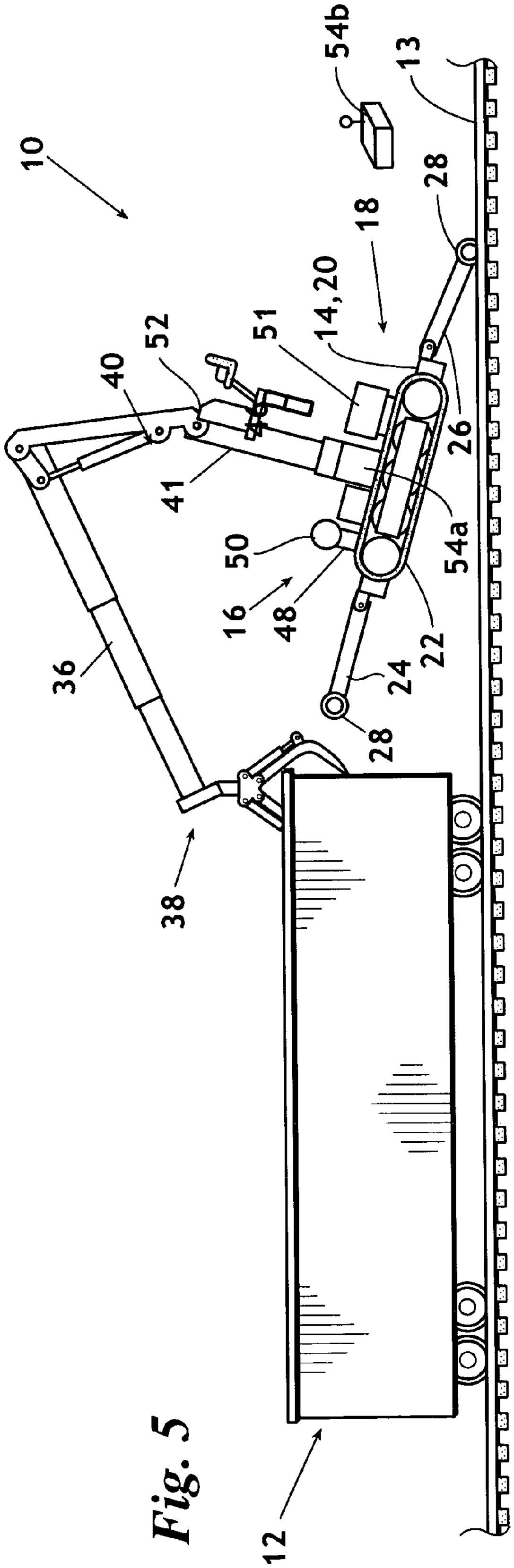
FIG. 5 is a schematic view of the material handler of FIG. 1 shown being lifted by the boom member.
Figure 6:
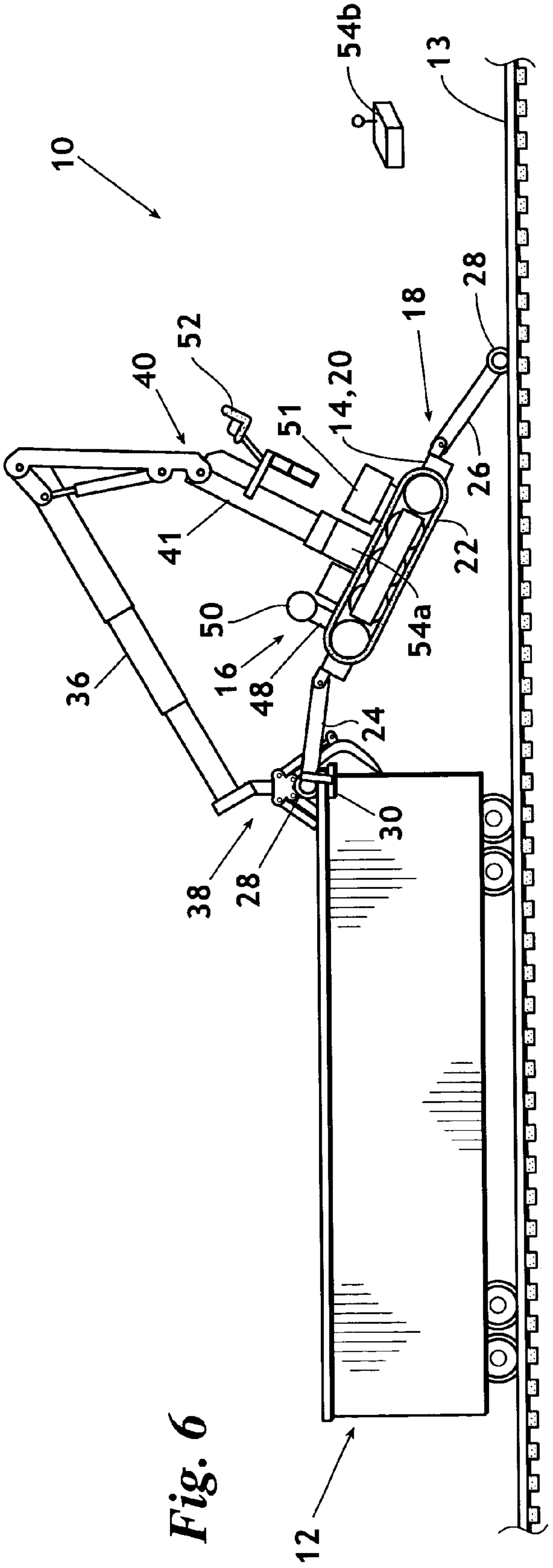
FIG. 6 is a schematic view of the material handler of FIG. 1 shown in an elevated position and clamped to an upper surface of the sides of a gondola car.
Figure 7:
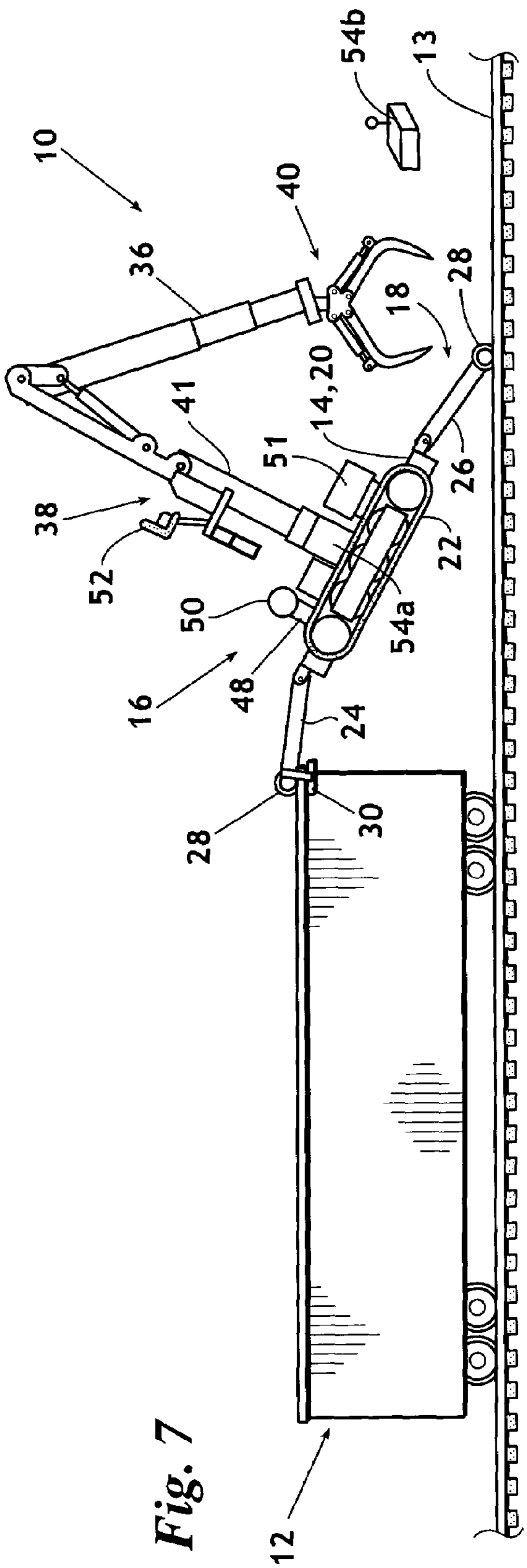
FIG. 7 is a schematic view of the material handler of FIG. 1 shown repositioning the boom member from a clamped position on an end of the gondola car.
Figure 8:
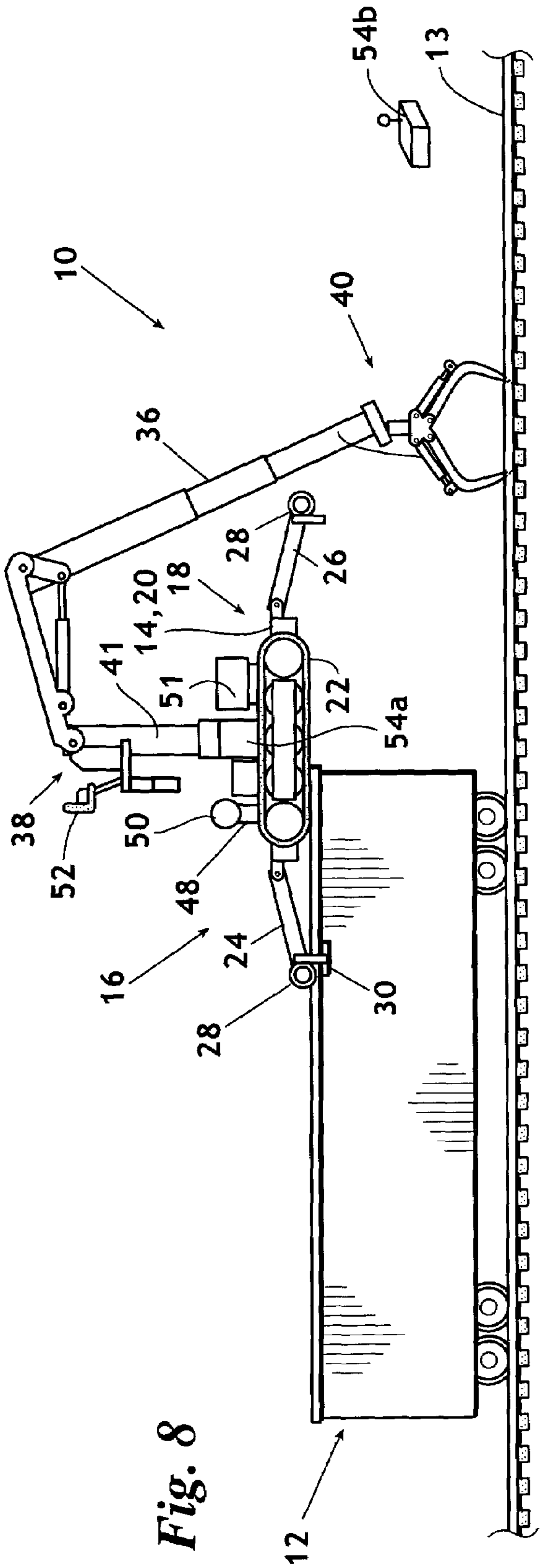
FIG. 8 is a schematic view of the material handler of FIG. 1 shown in the process of being elevated by the boom structure while pivoting about the front outrigger.
Figure 9:
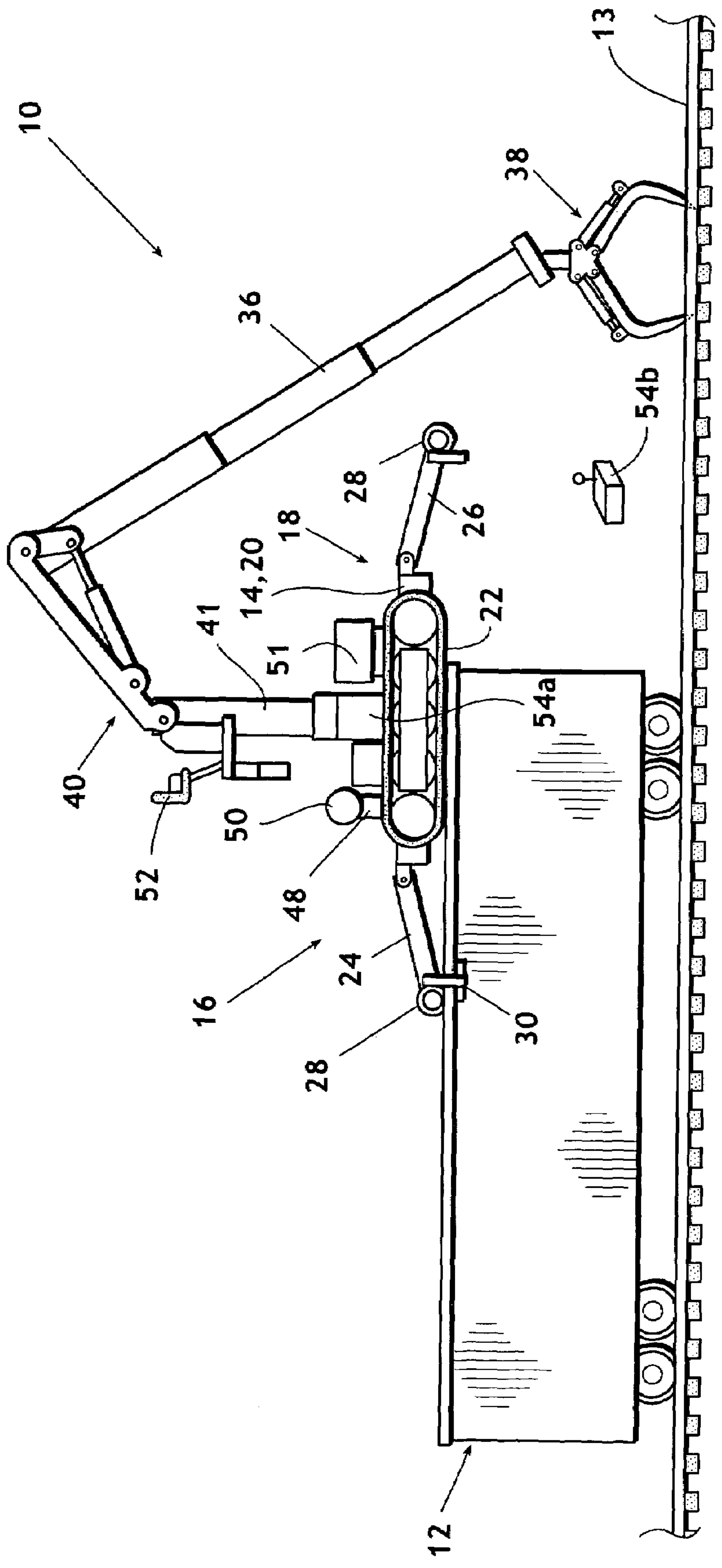
FIG. 9 is a schematic view of the material handler of FIG. 1 shown with the boom extended and the front outrigger wheels supporting the material handler on the top of the sides of a gondola car.
Figure 10:
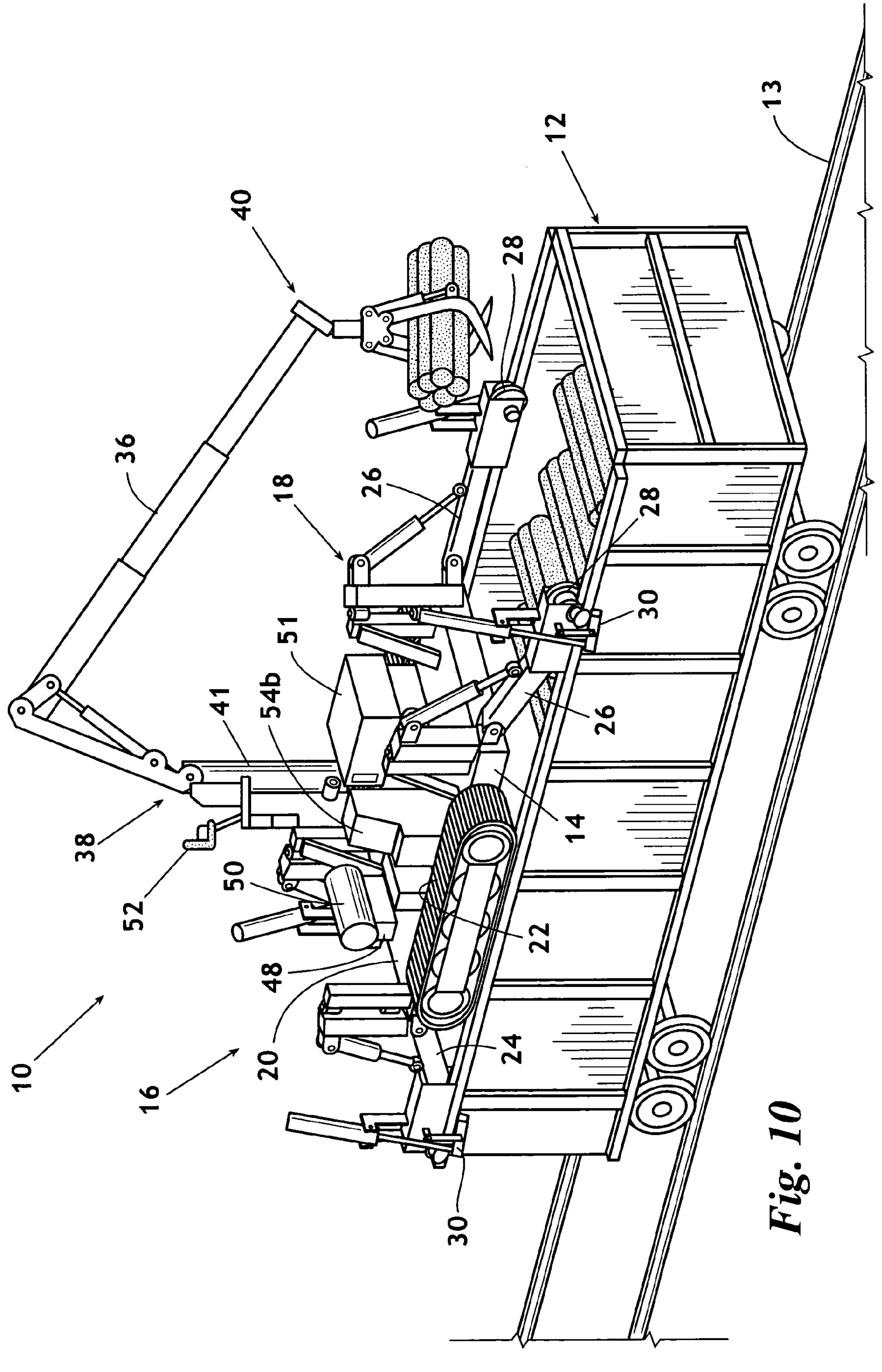
FIG. 10 is a schematic view of the material handler of FIG. 1 located on top of a gondola car.

Before explaining the present invention in detail, it is important to understand that the invention is not limited in its application to the details of the embodiments and steps described herein. The invention is capable of other embodiments and of being practiced or carried out in a variety of ways. It is to be understood that the phraseology and terminology employed herein is for the purpose of description and not of limitation.

Referring now to FIGS. 1-10 a material handler 10 is provided for loading and unloading an open topped railroad car, such as gondola car 12, shown located on railroad tracks 13 (FIGS. 3-10). Material handler 10 has a chassis 14 having a first end 16, a second end 18 and a top surface 20. Chassis 14 is preferably low in profile and is preferably rectangular in shape having four corners. A propulsion device, such as handler tracks 22 are affixed to chassis 14 to provide mobility for material handler 10. Although handler tracks 22 are shown, it should be understood that other propulsion devices may also be used, including wheels, rollers, or other devices. Handler tracks 22 are preferably driven by hydraulic power. In a preferred embodiment, handler tracks 22 have sufficient length to span between adjacent gondola cars 12. Tracks 22 are a source of mobility on the ground or on top of gondola car 12.

Stabilizers are provided such as outriggers 24, 26. Front outriggers 24 are extendible from first end 16 of chassis 14. Rear outriggers 26 are extendible from second end 18 of chassis 14. Outriggers 24, 26 are preferably attached to chassis 14 adjacent the four corners of chassis 14. Outriggers 24, 26 are preferably mounted enable movement in horizontal and vertical planes. Outriggers 24, 26 are used to raise material handler 10 off of the upper surface of gondola car 12 to lift handler tracks 22 for adjusting the positioning and width of handler tracks 22 as required. Additionally, after material handler 10 is loaded onto an upper surface of gondola car 12, outriggers 24, 26 provide structural support and stability to material handler 10. Outriggers 24, 26 are used to span the distance from railroad tracks 13 to the top of the gondola car 12, span the distance between the gondola cars 12, and to raise material handler 10 off of handler tracks 22 to adjust the spacing of handler tracks 22 to coincide with a width of a gondola car 12 and to make other adjustments. After material handler 10 is loaded onto gondola car 12, outriggers 24, 26 provide structural support and stability by connecting to the top of the sides of gondola car 12, e.g., by use of clamp 30. Material handler 10 may then perform loading and offloading tasks. During transportation of material handler 10 on a lowboy or trailer, outriggers 24, 26 may be stowed at an inclined angle.

Wheels 28 and clamps 30 are located at ends of outriggers 24, 26. Wheels 28 are used during loading and unloading of material handler 10 onto and off of a gondola car. Additionally, wheels 28 are used to engage a top surface of gondola car 12 when transferring material handler 10 from the top of one gondola car 12 to the top of another gondola car 12. Additionally, clamps 30 are provided to attach to either railroad tracks 13 or to sides of gondola cars 12 for the purpose of stabilizing the material handler 10 while operating knuckle boom 36 when loading or unloading material to or from the gondola car 12. The wheel-clamp combination secures the material handler 10 during operation of the material handler 10 when self-loading or unloading onto and from the gondola car 12. The wheels 28 are contoured to produce a minimum skew between the wheel 28 and the wall of the gondola car 12 to prevent wheels 28 from sliding to an outboard side of gondola cars 12 and to permit wheels 28 to ride on railroad tracks 13 in addition to riding on the sides of gondola cars 12. Wheels 28 may be swivel mounted or solidly mounted to outriggers 24, 26.

Clamps 30 are mounted in conjunction with the wheels 28 on outriggers 24, 26 and have a mechanism hydraulically actuated to clamp on a top lip of sides of gondola car 12 to affix or release outrigger 24, 26 to or from gondola car 12. Clamp 30 is preferably mounted in line perpendicular to a tangent to the wheel contact surface. Typically, the top of the sides of a gondola car 12 has a surface perpendicular to the side of gondola car 12. The outside edge of the top surface of gondola car 12 is typically bent 90 degrees to form an “L” for structural strength or made with box beams. Clamping pads on clamps 30 are attached to a mechanism powered by a hydraulic cylinder to move the clamp 30 from a stowed position above an adjacent wheel 28 to a final position under the gondola top surface in a corner adjacent to the side of the gondola car 12. The clamp pad of clamp 30 creates a reactionary force against a rim of an adjacent wheel 28 on an inside face of the side of gondola car 12 and a contact surface of wheel 28.

Material handler 10 is positioned on top of gondola car 12 by means of handler tracks 22, which are in contact with the top of the sides of gondola cars 10. Wheels 28, which are attached to each of outriggers 24, 26, assist in guiding material handler 10 by riding on the top surface of gondola cars 12 in conjunction with partially extended clamps 30 to help guide material handler 10. Clamps 30 may be used to affix material handler 10 to the top of gondola car 12 while gondola car 12 is performing loading and offloading tasks.

Figure 11:
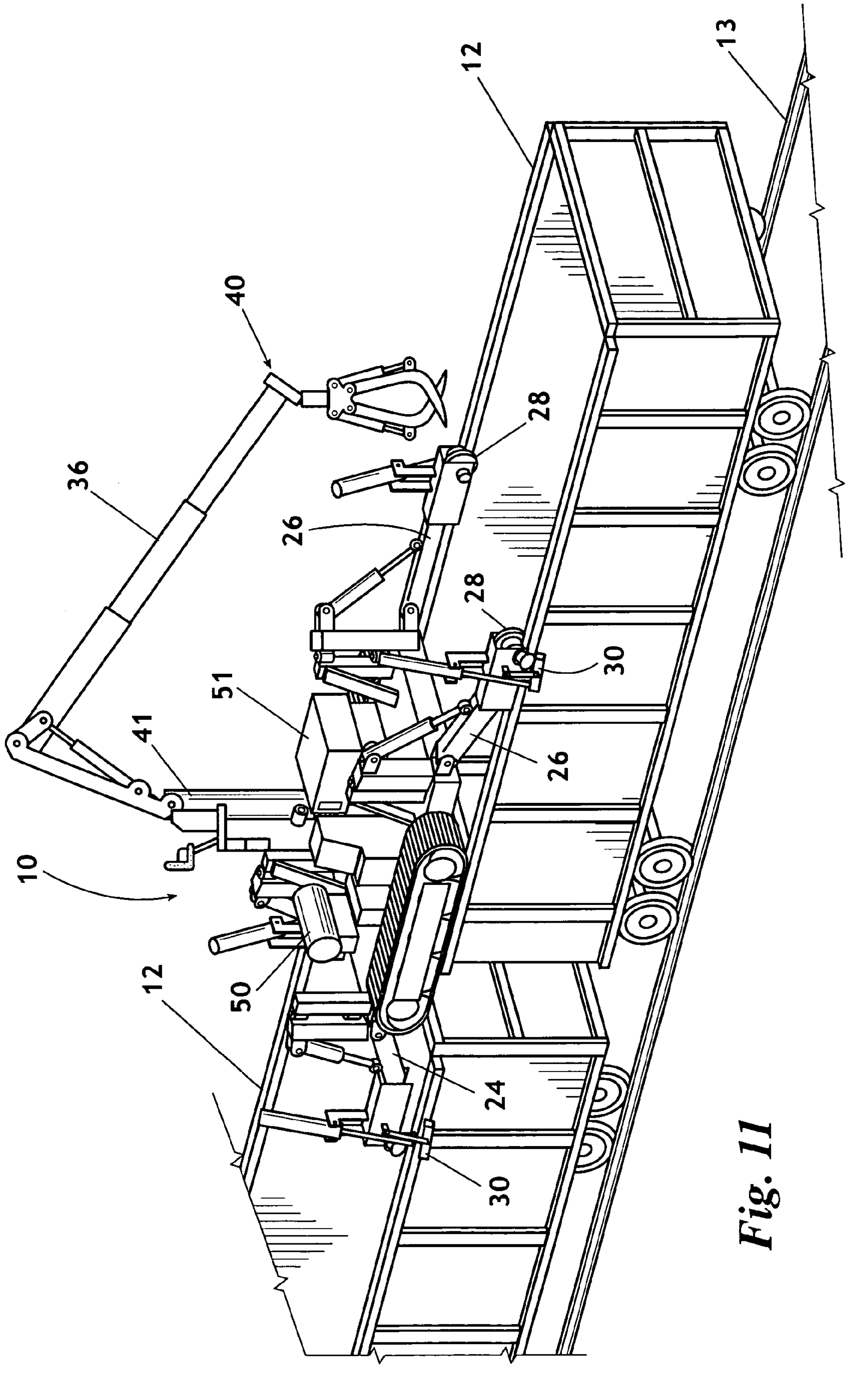
FIG. 11 is a schematic view of the material handler of FIG. 1 shown transferring from a top of a first gondola car to a top of an adjacent railroad car having a different width.
Figure 12:
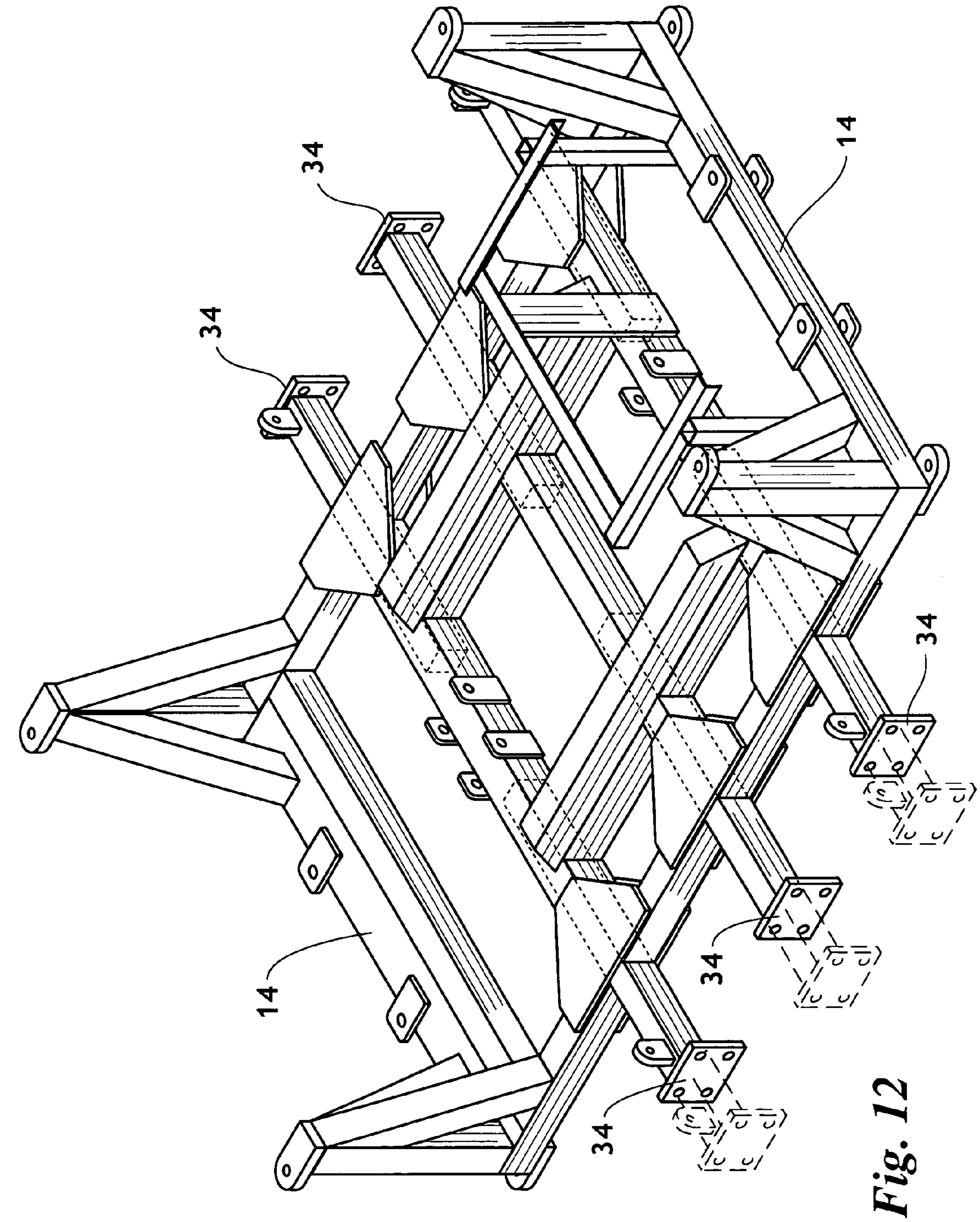
FIG. 12 is a perspective view of a frame and frame extender assembly of the material handler of FIG. 1.

Preferably, handler tracks 22 are mounted on hydraulically operated frame extenders 34 (FIG. 12) that are attached to chassis 14. Frame extenders 34 move in and out laterally to adjust a distance between each set of tracks 22. For example, it may be desirable to retract frame extenders 34 so that tracks 22 will fit on a trailer or truck for transporting material handler 10 on highways. However, frame extenders 34 may need to adjust the distance between tracks 22 so that tracks 22 are positioned above the sides of gondola car 12. Frames 34 move in and out laterally to adjust the width of tracks 22. Gondola cars 12 may be of different widths, e.g., a typical width of gondola car 12 may be from 9'2" to 10'10" outside dimensions. Typical gondola cars 12 have dimension ranges of an inside width from 7'9"-9'9", an inside height from inside floor to top of side boards of 3'3"-10'0" and an inside length of 30'-65'6". Typical gondola cars 12 additionally have outside dimensions including outside widths of from 9'2"-10'10", height ranges from top of rail to top of side boards from 8'4"-13'9" and outside lengths ranging from 32'-68'. As shown in FIG. 11, handler tracks 22 and outriggers 24, 26 may need to be adjusted to accommodate cars 12 having different widths when material handler 10 transfers from one car 12 to an adjacent car 12. Additionally, a very narrow width setting may be desirable when transporting material handler 10 by trailer or truck on highways.

Material hander 10 is further provided with a knuckle boom 36. Knuckle boom 36 has a distal end 38 and a proximal end 40. Proximal end 40 of knuckle boom 36 is rotatably affixed to top surface 20 of chassis 14. Knuckle boom 36 is preferably provided with a mounting plate 42 for facilitating the attachment to chassis 14. A preferred embodiment of the knuckle boom assembly is adapted to rotate in excess of 360°. Additionally it is preferred that boom 36 be configured to accept implements 44 of various types, such as grapple 44 on distal end 38 of knuckle boom 36.

An engine 50, such as a diesel engine, is preferably affixed to chassis 14. Additionally a hydraulic pump 48 and hydraulic oil tank 51 are preferably provided. Engine 50, hydraulic pump 48, and hydraulic oil tank 51 are preferably configured such that they do not interfere with rotation of knuckle boom 36. Engine 50, hydraulic pump 48, and hydraulic oil tank 51 provide power to knuckle boom 36 and to other hydraulic motors or cylinders. Fuel tank 46 is preferably located a safe distance from engine 50.

An operator station 52 is preferably affixed to knuckle boom 36. Operator station 52 preferably rotates with knuckle boom 36. A remote control system 54 is provided for selectively activating outriggers 24, 26, handler tracks 22, clamps 30, extenders 34, and knuckle boom 36.

In a preferred embodiment, material handler 10 is relatively light weight. Consequently, the weight of material handler 10 is typically not sufficient to counteract a load of the material that is being handled when knuckle boom 36 is in extended to positions external to gondola car 12. In place of using counterbalance weights or incorporating a heavy chassis for stability, stability of material handler 10 is achieved by the use of clamps 30 attached to outriggers 24, 26 extending from corners of material handler 10.

For safety purposes, material handler 10 is remotely controlled during self-loading onto gondola cars 12. The self-loading procedure begins with material handler 10 positioned at an end of a gondola car 12. Rear outriggers 26, which point away from gondola car 12, are extended to align with railroad tracks 13 wherein the outrigger mounted wheels 28 are placed on the railroad tracks 13. Boom 36 is then extended and attaches to a near end of gondola car 12 at a top-center of the end of gondola car 12. Front end 16 of material handler 10 is then lifted until wheels 28 mounted on front outriggers 24 rest on the top-side/end of gondola car 12 while rear outriggers 26 extend downwardly towards the rails of railroad tracks 13.

At this time, chassis 14 is in an inclined position and is supported by the four outriggers 24, 26. In the process of placing material handler 10 in an inclined position, wheels 28 of outriggers 24, 26 move along the rails of railroad tracks 13 as the front of material handler 10 is raised. In the final inclined position, rear outriggers 26 may be clamped securely to the rails of railroad tracks 13 by hydraulically actuated clamps 30. Alternatively, clamps 30 can be secured to gondola car 12 and not to railroad tracks 13. Front outriggers 24 are positioned onto the top of the sides of gondola cars 12. Wheels 28 are aligned with the tops of the sides of gondola car 12 and clamping mechanisms 30 are actuated to secure a top end of material handler 10.

In this fixed position, the grapple on boom 36 is released from the top-center of the end of gondola car 12 and boom 36 is pivoted 180 degrees on a turntable mounting until the grapple is centered on railroad tracks 13 and located underneath chassis 14 of material handler 10. Boom 36 is then used to hold the position of chassis 14 and the four outrigger clamps 30 are released. At this time, boom 36 is operated to pivot extended outriggers 24, 26 and chassis 14 about the wheels 28 located on top of sides of gondola car 12. Handler tracks 22 are maintained off of the sides of gondola car 12 until the center of gravity of handler tracks 22 is over gondola car 12. Once the center of gravity is located above gondola car 12, handler tracks 22 are placed in contact with the sides of gondola car 12. Loading can then be completed by engaging the top of gondola car 12 with handler tracks 22 to assist in pulling material handler 10 onto the top of gondola car 12. Once the full tracks 22 and outriggers 24, 26 are on top of gondola car 12, all four outriggers 22, 24 are adjusted to place wheels 28 on the top of the sides of gondola car 12. At this time, the operator may wish to cease controlling the system remotely and seat himself in the operator control seat on the material handler 10 to control boom 36 for loading materials into or out of gondola car 12.

Unloading material handler 10 from the top of gondola car 12 is preferably done by remote control. Material handler 10 is placed at an end of gondola car 12 with handler tracks 22 lined up with the end of gondola car 12 and wherein front outriggers 24 extend beyond the end of gondola car 12. Rear outriggers 26 are positioned on the sides of gondola car 12 with the clamping mechanisms 30 secured in place. Boom 36 is then extended down to rest the grapple in between the rails of railroad tracks 13 on the ties/bed region. Once boom 36 is positioned between the rails of railroad tracks 13, boom 36 is adjusted to support a portion of the weight of material handler 10. At this time, the rear clamps 30 are released from gondola car 12. Tracks 22 are then used to propel material handler 10 off of the end of gondola car 12 while boom 36 supports material handler 10 and maintains the grapple in place on the ground. From this point on, the unloading operation is just opposite of the procedures used to load material handler 10 on top of gondola car 12.

To move from one gondola car 12 to another, material handler 10 is moved to the end of a first gondola car 12 that is adjacent to a second gondola car 12 onto which it is desired to relocate material handler 10. Front outriggers 24 are inclined or declined and moved in or out laterally to place wheels 28 onto the top of the sides of the second gondola car 12. While front outriggers 24 are partially supporting material handler 10, handler tracks 22 are engaged to move forward so that the gap between the two gondola cars 12 is spanned. When tracks 22 are sufficiently engaged on gondola car 12 that is being mounted, outriggers 24, 26 are engaged to lift handler tracks 22 free from the upper surface of gondola cars 12. Handler tracks 22 are then adjusted by frame extenders 34 and tracks 22 are lowered to come into contact with the top of the sides of the second gondola car 12. Handler tracks 22 may then be used to propel material handler 10 forward until material handler 10 is resting on the top of the sides of the second gondola car 12. Back outriggers 26 are then aligned with the tops of second gondola car 12 to provide full mounting onto gondola car 12.

As can be determined from the description above, the material handler 10 of the invention is advantageous in that the outriggers 24, 26 and clamps 30 secure the material handler 10 so that it can be lightweight. The material handler 10 of the invention provides for an increased measure of safety by allowing an operator to load and unload the handler onto and off of railroad cars via remote control 54. Finally, the ability of an operator to position himself on a the material handler 10 after the material handler 10 has been firmly secured onto the top of the gondola car 12 allows the operator to precisely control cargo manipulation without subjecting himself to unnecessary dangers.

While the invention has been described with a certain degree of particularity, it is understood that the invention is not limited to the embodiment(s) set for herein for purposes of exemplification, but is to be limited only by the scope of the attached claim or claims, including the full range of equivalency to which each element thereof is entitled.

What is claimed is:

1. A material-handler adapted for locating on top of an open topped railroad car comprising:

a chassis having a first end and a second end and a top surface;

a propulsion device for selectively propelling said chassis in a forward direction forward of said first end or in a rearward direction rearward of said second end;

a first stabilizer extending in said forward direction beyond said first end of said chassis for extending forwardly of said first end of said chassis, said first stabilizer having a distal end;

a second stabilizer extending in said rearward direction beyond said second end of said chassis for extending rearwardly of said second end of said chassis, said second stabilizer having a distal end;

wherein said first stabilizer and said second stabilizer are pivotally mounted to said chassis;

said first stabilizer is comprised of a pair of outriggers; said second stabilizer is comprised of a pair of outriggers;

a wheel located at each distal end of said first pair of outriggers and said second pair of outriggers;

said wheel having a contact surface and a rim portion;

an actuatable clamp located at each of said distal ends of said first stabilizer and said second stabilizer, said actuatable clamp for selectively clamping a railroad car top surface between said clamp and said rim portion of said wheel; and a knuckle boom rotatably mounted with respect to said chassis.

2. The material handler according to claim 1 wherein:

said propulsion device is a pair of tracks.

3. The material handler according to claim 2 wherein:

said tracks are a source of mobility on the ground and on top of the railroad car where said tracks are adapted to engage an upper surface of said railroad car.

4. The material handler according to claim 1 wherein:

said material handler is of sufficient length to span between adjacent railroad cars that are end to end on a length of railroad track.

5. The material handler according to claim 1 wherein:

said outriggers are adjacent to handler tracks on each end of the chassis.

6. The material handler according to claim 1 wherein:

said outriggers are pivotally mounted to said chassis in a manner that facilitates movement of said outriggers in horizontal and vertical directions; and further comprising an adjustable terminal end for facilitating a parallel orientation of said terminal ends when said outriggers are adjusted horizontally.

7. The material handler according to claim 1 wherein:

said wheels are shaped to engage a rail, a railroad track, and an upper surface of a side of the railroad car.

8. The material handler according to claim 2 wherein:

said outriggers are of sufficient length to enable said outriggers to span a distance from railroad tracks to the top of the railroad car; and said outriggers are configured such that said first pair of outriggers can contact said top of said railroad car and said second pair of outriggers can support said chassis in an elevated position.

9. The material handler according to claim 1 wherein:

said outriggers are of sufficient length to enable said outriggers to span a distance between adjacent railroad cars that are end to end on a length of railroad track.

10. The material handler according to claim 1 wherein:

said outriggers are of sufficient length and strength to raise said material handler off a surface in contact with said propulsion device to allow adjustment of a position of said propulsion device.

11. The material handler according to claim 1 wherein:

said outriggers clamp to sides of the railroad car for stabilizing said chassis during material loading and offloading tasks.

12. The material handler according to claim 1 wherein:

said propulsion device comprises a first portion on a first side of said chassis and a second portion on a second side of said chassis;

frame extenders connecting said chassis and said first portion and said second portion of said propulsion device, said frame extenders for selectively adjusting a width between said first portion and said second portion of said propulsion device to accommodate various widths of adjacent railroad cars.

13. The material handler according to claim 1 wherein:

said knuckle boom is rotatably connected to said upper surface of said chassis.

14. The material handler according to claim 1:

wherein said knuckle boom is adapted to rotate in excess of 360 degrees.

15. The material handler according to claim 1 further comprising:

a grapple affixed to said distal end of said knuckle boom.

16. The material handler according to claim 1 further comprising:

an engine affixed to said chassis for powering a device selected from a group consisting of said boom, said tracks, and a hydraulic pump.

17. The material handler according to claim 1 further comprising:

a hydraulic pump for powering said boom or said propulsion device.

18. The material handler according to claim 1 further comprising:

a remote control system with a separate transmitter or controller for selectively activating at least one device selected from the group consisting of said outriggers, said boom, and said propulsion device for allowing an operator to stand a safe distance away from the material handler during operation.

19. The material handler according to claim 1 wherein said wheel is swivel mounted to said outrigger for facilitating an ideal orientation when clamped to railroad cars of various widths and heights.

20. The material handler according to claim 1 wherein said outriggers may be adjusted to accommodate various widths and heights of railroad cars.

* * * * *